(12) United States Patent
Li

(10) Patent No.: US 12,745,187 B2
(45) Date of Patent: Sep. 22, 2026

(54) POWER INFORMATION TRANSMITTING METHOD AND APPARATUS, POWER INFORMATION RECEIVING METHOD AND APPARATUS, AND DEVICE AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 357 days.

(21) Appl. No.: 18/568,567

(22) PCT Filed: Jun. 17, 2021

(86) PCT No.: PCT/CN2021/100707

§ 371 (c)(1),
(2) Date: Dec. 8, 2023

(87) PCT Pub. No.: WO2022/261905

PCT Pub. Date: Dec. 22, 2022

(65) Prior Publication Data

US 2024/0276386 A1 Aug. 15, 2024

(51) Int. Cl.

*H04W 52/14* (2009.01)
*H04B 7/06* (2006.01)
*H04W 52/36* (2009.01)

(52) U.S. Cl.

CPC ........ *H04W 52/146* (2013.01); *H04B 7/0617* (2013.01); *H04W 52/367* (2013.01)

(58) Field of Classification Search

CPC ............. H04W 52/146; H04W 52/367; H04W 52/365; H04W 52/42; H04W 52/54; H04W 52/241; H04W 52/248; H04W 52/28; H04W 72/21; H04W 24/08; H04W 72/51; H04B 7/0617; H04B 7/06956; H04B 7/06952

See application file for complete search history.

(56) References Cited

U.S. PATENT DOCUMENTS 12,531,614 B2 * 1/2026 Zhou .................... H04B 7/0626
2022/0217654 A1 * 7/2022 Kang .................. H04W 52/346
2024/0014875 A1 * 1/2024 Yuan ...................... H04W 16/28
2024/0015663 A1 * 1/2024 Yuan ...................... H04W 52/42
2024/0015666 A1 * 1/2024 Yuan ................... H04W 52/365
2024/0040520 A1 * 2/2024 Matsumura ......... H04W 72/231

(Continued)

FOREIGN PATENT DOCUMENTS

WO WO 2019/099634 A1 5/2019
WO WO 2020218900 A1 10/2020
WO 2022009427 A1 1/2022

OTHER PUBLICATIONS

CATT, “Enhancements on multi-beam operation”, R1-2104484, 3GPP TSG RAN WG1 #105-e, e-Meeting, May 19-27, 2021, 12 pages.

(Continued)

*Primary Examiner* — Fayyaz Alam

(74) *Attorney, Agent, or Firm* — Finnegan, Henderson, Farabow, Garrett & Dunner, L.L.P.

(57) ABSTRACT

A method for transmitting power information is performed by a terminal, and includes: transmitting power information to a network device; wherein the power information corresponds to an uplink panel of the terminal or an uplink beam of the terminal.

16 Claims, 4 Drawing Sheets

(56) References Cited

U.S. PATENT DOCUMENTS

2024/0172133 A1* 5/2024 Yuan .................... H04B 7/0626
2025/0081124 A1* 3/2025 Yao ..................... H04W 72/046

OTHER PUBLICATIONS

Notice of Reasons for Refusal for Japanese Patent Application 2023-575570 dated Apr. 16, 2025, 8 pages.
International Search Report and Written Opinion of International Application No. PCT/CN2021/100707, dated Mar. 16, 2022, 14 pages.
ZTE, "Enhancements on multi-beam operation", 3GPP TSG RAN WG1 Meeting #98, R1-1908192, Prague, CZ, Aug. 26-30, 2019, 26 pages.
Notice of Reasons for Refusal issued by the Japanese Patent Office on Dec. 3, 2024, in corresponding Application No. JP 2023-575570, 9 pages.
Office Action issued by the Patent Office of the Russian Federation Federal Institute of Industrial Property on Jul. 16, 2024, in corresponding Application No. RU 2023136244/07, 9 pages.
Extended European Search Report Issued in Application No. 21945491.5 dated Jun. 27, 2024, 11 pages.
"Discussion on MPE enhancements", Ericsson, 3GPP TSG-RAN WG2 #111-e, Tdoc R2-2008093, Electronic meeting, Aug. 17, 2020-Aug. 28, 2020, 6 pages.
"Further discussion on multi beam enhancement", vivo, 3GPP TSG RAN WG1 #104-e, R1-2100421, e-Meeting, Jan. 25-Feb. 5, 2021, 29 pages.
Office Action issued by the Korean Patent Office on Feb. 6, 2026, in corresponding KR Application No. 10-2024-7001928, 15 pages.
3rd Generation Partnership Project; Technical Specification Group Radio Access Network; NR; Medium Access Control (MAC) protocol specification (Release 16), 3GPP TS 38.321 V16.4.0, (Mar. 2021) , 155 pages.

* cited by examiner

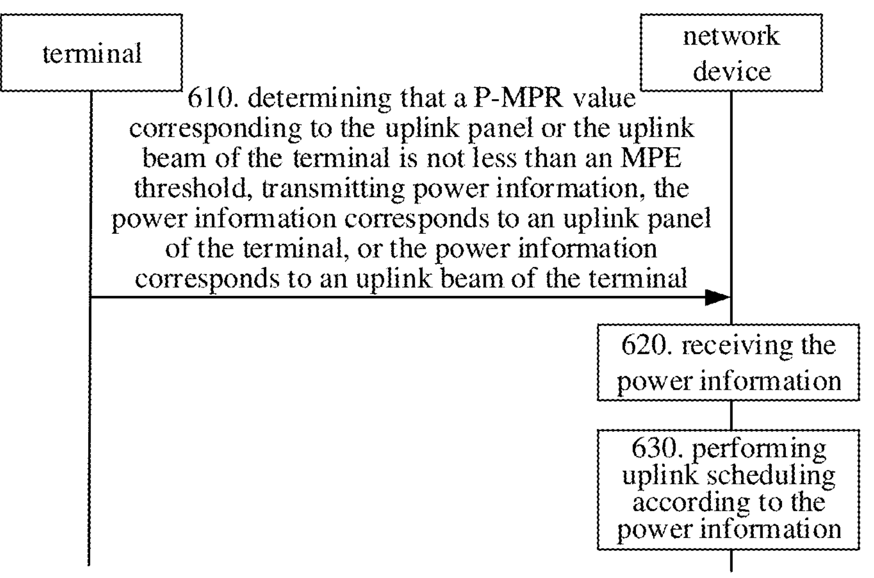

FIG. 6 terminal network device 710. transmitting power information, the power information corresponds to an uplink panel of the terminal, or the power information corresponds to an uplink beam of the terminal 720. receiving the power information 730. transmitting beam measurement information, the beam measurement information corresponds to the uplink panel of the terminal, or the beam measurement information corresponds to the uplink beam of the terminal 740. receiving the beam measurement information 750. performing uplink scheduling according to the beam measurement information

FIG. 7

POWER INFORMATION TRANSMITTING METHOD AND APPARATUS, POWER INFORMATION RECEIVING METHOD AND APPARATUS, AND DEVICE AND STORAGE MEDIUM

CROSS REFERENCE TO RELATED APPLICATIONS

This application a U.S. national phase of International Application No. PCT/CN2021/100707, filed on Jun. 17, 2021, the entire contents of which are incorporated herein by reference.

TECHNICAL FIELD

The present disclosure relates to a field of mobile communications, and more particularly, to a method and an apparatus for transmitting power information, a method and an apparatus for receiving power information, a device, and a storage medium.

BACKGROUND

In a New Radio (NR) system, due to a fast attenuation rate of a high-frequency channel, beam-based transmission and reception are usually required to ensure a coverage range.

When a terminal has multiple antenna panels, abbreviated as panels, each panel corresponds to multiple beam directions. The directions of the panels or beams are different, such as facing a human body or facing away from the human body. When the terminal performs uplink transmission, an impacts on an uplink panel or an uplink beam varies due to a limitation of Maximum Permissible Exposure (MPE). For example, an uplink panel facing the human body is greatly affected by the MPE and its transmission power may be significantly reduced. For example, an uplink beam facing away from the human body is less affected by the MPE, and a slight reduction in its transmission power is sufficient.

SUMMARY

According to an aspect of the present disclosure, there is provided a method for transmitting power information. The method includes:

- transmitting, by a terminal, power information to a network device;
- in which, the power information corresponds to an uplink panel of the terminal, or the power information corresponds to an uplink beam of the terminal.

According to an aspect of the present disclosure, there is provided a method for receiving power information. The method includes:

- receiving, by a network device, power information transmitted by a terminal;
- in which, the power information corresponds to an uplink panel of the terminal, or the power information corresponds to an uplink beam of the terminal.

According to an aspect of the present disclosure, there is provided a terminal. The terminal includes: a processor and a memory. The memory stores at least one program code thereon. The program code is loaded and executed by the processor to perform the above method for transmitting power information.

According to an aspect of the present disclosure, there is provided a network device. The network device includes: a processor and a memory. The memory stores at least one program code thereon. The program code is loaded and executed by the processor to perform the above method for receiving power information.

According to an aspect of the present disclosure, there is provided a computer-readable storage medium having stored therein at least one program code. The program code is loaded and executed by a processor to perform the above method for transmitting power information or the above method for receiving power information.

BRIEF DESCRIPTION OF THE DRAWINGS

A brief introduction is made below to the accompanying drawings.

FIG. 6 is a flow chart illustrating a method for transmitting and receiving power information according to an exemplary embodiment of the disclosure.

FIG. 7 is a flow chart illustrating a method for transmitting and receiving power information according to an exemplary embodiment of the disclosure.

DETAILED DESCRIPTION

To make the purpose, technical solution and advantages of the disclosure more clear, implementations of the disclosure will be further described in detail with reference to the accompanying drawings.

In the related art, a terminal having multiple antenna panels is often viewed as a whole, which leads to a network device being unable to select the most suitable uplink panel or uplink beam, thereby affecting uplink transmission performance.

Thus, embodiments of the present disclosure provide a method and an apparatus for sending power information, a method and an apparatus for receiving power information, a device, and a storage medium, in which distinguish an uplink panel or an uplink beam of a terminal is distinguished, the terminal sends power information corresponding to the uplink panel or the uplink beam of the terminal to the network device, to facilitate the network device to perform uplink scheduling. The technical solution is as follows.

Figure 1:
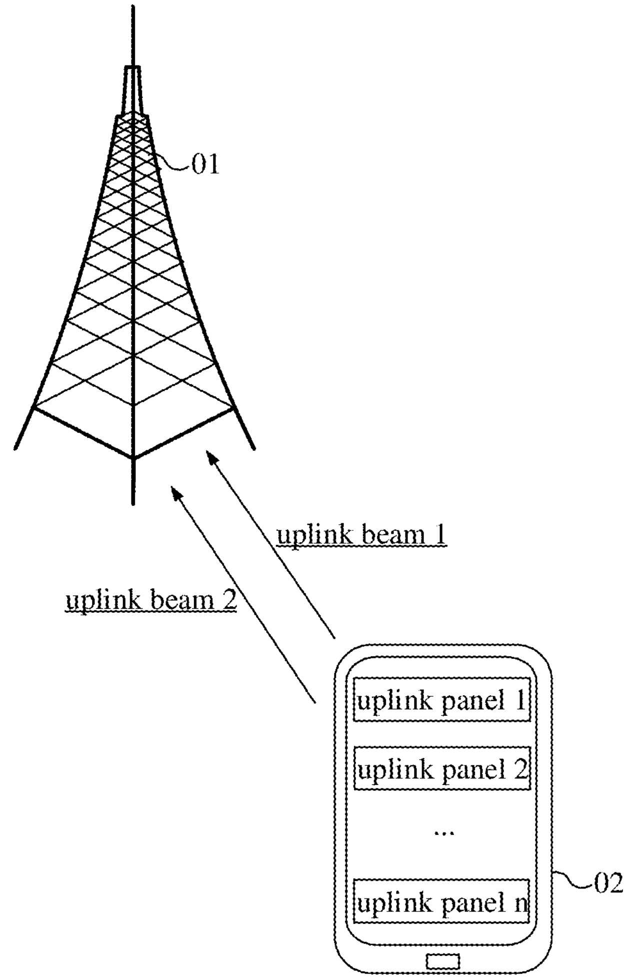
FIG. 1 is a schematic diagram illustrating a mobile communication system according to an embodiment of the disclosure.

FIG. 1 is a schematic diagram illustrating a mobile communication system according to an embodiment of the disclosure. The system includes a network device 01 and a terminal 02.

The terminal 02 is equipped with at least one uplink panel, and the terminal 02 communicates with the network device 01 through an uplink beam.

The uplink beam is transmitted by the uplink panel. One uplink panel may correspond to one or more uplink beams, with each uplink beam having a different transmission direction. For example, the terminal 02 is equipped with an uplink panel 1, an uplink panel 2 . . . an uplink panel n, and an uplink beam 1 and an uplink beam 2 are transmitted by the uplink panel 1.

An uplink panel and a downlink panel used for transmission of the terminal 02 may be the same antenna panel or different antenna panels.

That is, the terminal 02 reports information or data to the network device 01 through an uplink beam.

Correspondingly, the network device 01 transmits information to the terminal 02 through a downlink beam. For example, one uplink beam corresponds to one downlink beam.

Figure 2:
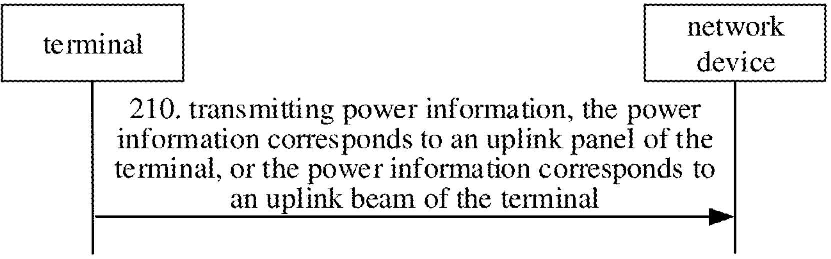
FIG. 2 is a flow chart illustrating a method for transmitting power information according to an exemplary embodiment of the disclosure.

FIG. 2 is a flow chart illustrating a method for transmitting power information according to an exemplary embodiment of the disclosure. For example, the method for transmitting power information is performed by the terminal 02 in FIG. 1, the method includes following steps.

Step 210, the terminal transmits power information to a network device.

Schematically, the power information corresponds to an uplink panel of the terminal, or the power information corresponds to an uplink beam of the terminal.

The power information refers to parameter information related to power management of the terminal. In some embodiments, the power information includes at least one of the following four types of information.

A first type of information: panel identification information of a first uplink panel, and a Power Management-Maximum Power Reduction (P-MPR) measurement value and/or a power headroom value corresponding to the first uplink panel. The P-MPR value of the first uplink panel is not less than a Maximum Permissible Exposure (MPE) threshold.

Schematically, the panel identification information refers to panel-related identification information. The panel identification information includes at least one of the following identifications: a panel identification; an identification of a reference signal set; an identification of a reference signal; an identification of a Transmission Configuration Indication (TCI) state; or an identification of spatial relationship information (Spatialrelationinfo).

The panel identification refers to a device identification code corresponding to a panel, which is equivalent to ID identification of the panel.

According to the aforementioned content, one uplink panel corresponds to at least one uplink beam. Schematically, each uplink beam has at least one of: the identification of a reference signal, the identification of a TCI state, and the identification of spatial relationship information. In the disclosure, a beam may be exchanged with at least one of the following: a TCI state, spatial relationship information, a spatial setting, or a quasi co-location (QCL) type D.

The reference signal includes at least one of the following: a Channel State Information-Reference Signal (CSI-RS), a Synchronization Signal Block (SSB), or a Sounding Reference Signal (SRS).

Schematically, the identification of a reference signal set includes multiple identifications of reference signals. The identification of the reference signal set has a corresponding relationship with the uplink panel. The identification of the reference signal set may be configured to indicate the uplink panel, and an identification of a reference signal in the identification of the reference signal set may also be configured to indicate the uplink panel. The TCI state information includes the identification of the reference signal, and the identification of the reference signal has a corresponding relationship with the uplink panel. Therefore, the identification of the TCI state can also be configured to indicate the uplink panel.

The TCI state is configured to inform the terminal that a beam configured to receive a Physical Downlink Control Channel (PDCCH), a Physical Downlink Shared Channel (PDSCH), or a downlink reference signal is the same beam as a receiving beam and/or a transmitting beam configured to indicate a reference signal of a beam in the TCI state. Alternatively, The TCI state is configured to inform the terminal that a beam configured to transmit a Physical Uplink Control Channel (PUCCH), a Physical Uplink Shared Channel (PUSCH), or an uplink reference signal is the same beam as the receiving beam and/or the transmitting beam configured to indicate a beam of a reference signal in the TCI state.

In addition, the P-MPR refers to a reduction value of a maximum transmission power of the terminal when a MPE requirement is satisfied. The power headroom value refers to a difference between an uplink transmission power of the terminal and a maximum transmission power of the terminal. Power Headroom Report (PHR) may provide the network device with information for power control and scheduling. The MPE is an indicator requirement that limits electromagnetic radiation of the terminal from a perspective of human safety, and is configured to specify an average maximum radiation power density of the terminal in a certain direction.

A second type of information: beam identification information of a first uplink beam, and a P-MPR measurement value and/or a power headroom value corresponding to the first uplink beam. The P-MPR value of the first uplink beam is not less than the MPE threshold.

Schematically, the beam identification information is beam-related indication information. The beam identification information includes at least one of the following identifications: an identification of a reference signal: an identification of a TCI state: or an identification of spatial relationship information.

The reference signal includes at least one of: a CSI-RS: a SSB: or a SRS.

In addition, the P-MPR refers to a reduction value of a maximum transmission power of the terminal when a MPE requirement is satisfied. The power headroom value refers to a difference between an uplink transmission power of the terminal and a maximum transmission power of the terminal. The MPE is an indicator requirement that limits the electromagnetic radiation of the terminal from a perspective of human safety, and is configured to specify an average maximum radiation power density of the terminal in a certain direction.

A third type of information: panel identification information of a second uplink panel, and a P-MPR measurement value and/or a power headroom value corresponding to the second uplink panel. The P-MPR value of the second uplink panel is less than the MPE threshold.

Schematically, the second uplink panel and the first uplink panel are different uplink panels. Explanation of the panel identification information, the P-MPR, the power headroom value, and the MPE may refer to aforementioned content, which is not repeated herein.

A fourth type of information: beam identification information of a second uplink beam, and a P-MPR measurement value and/or a power headroom value corresponding to the second uplink beam. The P-MPR value of the second uplink beam is less than the MPE threshold.

Schematically, the second uplink beam and the first uplink beam are different uplink beams. Explanation of the beam identification information, the P-MPR, the power headroom value, and the MPE may refer to aforementioned content, which is not repeated herein.

In an exemplary embodiment, the terminal transmits the power information to the network device. The power information includes at least one of a panel identification, an identification of a reference signal set, an identification of a TCI state, and an identification of spatial relationship information of the first uplink panel. The identification of the reference signal set includes multiple identifications of reference signals. In addition, the power information further includes the P-MPR measurement value and/or the power headroom value corresponding to the first uplink panel.

In an exemplary embodiment, the terminal transmits the power information to the network device. The power information includes at least one of an identification of a reference signal, an identification of a TCI state, and an identification of spatial relationship information of the first uplink beam, and the P-MPR measurement value and/or the power headroom value corresponding to the first uplink beam.

In an exemplary embodiment, the terminal transmits the power information to the network device. The power information includes at least one of a panel identification and an identification of a reference signal of the second uplink panel, and the P-MPR measurement value and/or the power headroom value corresponding to the second uplink panel.

In an exemplary embodiment, the terminal transmits power information to the network device. The power information includes an identification of a reference signal of the second uplink beam, and the P-MPR measurement value and/or the power headroom value corresponding to the second uplink beam.

Schematically, the above embodiments may be combined arbitrarily, which is not repeated herein.

In some embodiments, to enable the network device to obtain more accurate power information, the power information may include at least one of the following information.

n panel identifications and n pieces of first bit indication information. An i-th piece of first bit indication information is to indicate whether a P-MPR value corresponding to an i-th uplink panel of the terminal is less than the MPE threshold.

m beam identifications and m pieces of second bit indication information. A j-th piece of second bit indication information is to indicate whether a P-MPR value corresponding to a j-th uplink beam of the terminal is less than the MPE threshold.

Where, n and m are positive integers, i is a positive integer not greater than n, and j is a positive integer not greater than m.

According to the aforementioned content, one uplink panel corresponds to at least one uplink beam, therefore, n and m may be the same or may be different, which is not limited in the disclosure.

In an exemplary embodiment, taking a terminal including two uplink panels as an example, the power information includes two panel identifications and first bit indication information corresponding to each panel identification. The first bit indication information corresponding to the first panel identification indicates that a P-MPR value of the first uplink panel is less than the MPE threshold. The first bit indication information corresponding to the second panel identification indicates that a P-MPR value of the second uplink panel is not less than the MPE threshold.

Optionally, in a case where a P-MPR value corresponding to the first uplink panel or the first uplink beam of the terminal is not less than the MPE threshold, the power information further includes third bit indication information. The third bit indication information is to indicate the P-MPR measurement value corresponding to the first uplink panel or the first uplink beam.

In an exemplary embodiment, taking a terminal including two uplink beams as an example, the power information includes two beam identifications and second bit indication information corresponding to each beam identification. The second bit indication information corresponding to the first beam identification indicates that a P-MPR value of the first uplink beam is less than the MPE threshold. The second bit indication corresponding to the second beam identification indicates that a P-MPR value of the second uplink beam is not less than the MPE threshold.

The P-MPR value corresponding to the second beam identification is not less than the MPE threshold, thus, the power information also includes the third bit indication information, which indicates the P-MPR measurement value of the second uplink beam.

In summary, in the method for transmitting power information provided in the embodiment of the disclosure, the terminal transmits the power information corresponding to the uplink panel or the uplink beam, the network device can perform uplink scheduling based on the power information at a granularity of uplink panel or uplink beam, and can select an appropriate uplink panel or uplink beam, thereby improving the uplink transmission performance.

Meanwhile, the embodiments of the disclosure provide the information content contained in the power information and the information content contained in the corresponding identifications.

In addition, in the embodiments of the disclosure, the power information includes the first bit indication information or the second bit indication information, which is to indicate whether the P-MPR value of a corresponding uplink panel or uplink beam is greater than the MPE threshold. The power information further includes the third bit indication information, which is to indicate the P-MPR measurement value of a corresponding uplink panel or uplink beam.

Figure 3:
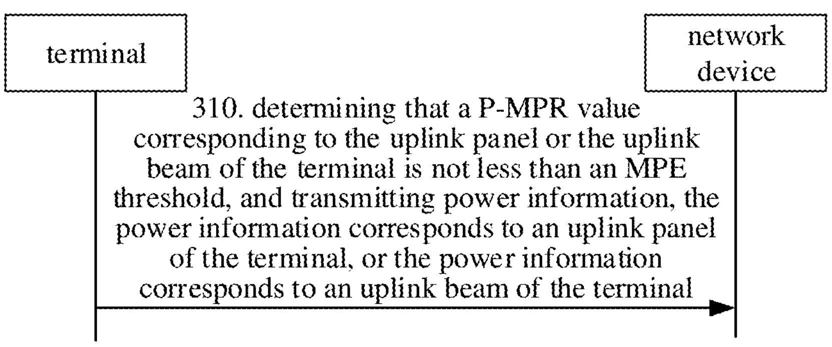
FIG. 3 is a flow chart illustrating a method for transmitting power information according to an exemplary embodiment of the disclosure.

FIG. 3 is a flow chart illustrating a method for transmitting power information according to an exemplary embodiment of the disclosure. For example, the method for transmitting power information is performed by the terminal 02 in FIG. 1, the method includes following steps.

Step 310, it is determined that a P-MPR value corresponding to an uplink panel or an uplink beam of the terminal is not less than an MPE threshold, and the terminal transmits power information to a network device.

Schematically, the power information corresponds to the uplink panel of the terminal, or the power information corresponds to the uplink beam of the terminal.

As mentioned above, the P-MPR refers to a reduction value of a maximum transmission power of the terminal when a MPE requirement is satisfied. The MPE is an indicator requirement that limits electromagnetic radiation of the terminal from a perspective of human safety, and is configured to specify an average maximum radiation power density of the terminal in a certain direction.

In step 310, a triggering condition for the terminal to transmit the power information to the network device includes: the P-MPR value corresponding to the uplink panel or the uplink beam of the terminal being not less than the MPE threshold. That is to say, the reduction value of a transmission power of the uplink panel or the uplink beam is greater than or equal to a preset threshold of the indicator.

For example, a current maximum transmission power of the uplink beam is 23 dB. In order to meet the MPE requirement, the reduction value of the transmission power of the uplink beam is 2 dB, and the MPE threshold is 3 dB. That is, the transmission power of the uplink beam is reduced by 2 dB to reduce an actual maximum transmission power of the uplink beam to 21 dB. However, the reduction value of 2 dB is less than the MPE threshold of 3 dB, therefore, the power reduction value of the beam is insufficient to trigger the reporting of the P-MPR value.

Furthermore, as mentioned above, the power information refers to parameter information related to power management of the terminal. In some embodiments, the power information includes at least one of the following four types of information.

A first type of information: panel identification information of a first uplink panel, and a P-MPR measurement value and/or a power headroom value corresponding to the first uplink panel. The P-MPR value of the first uplink panel is not less than an MPE threshold.

Schematically, the panel identification information refers to panel-related identification information. The panel identification information includes at least one of the following identifications: a panel identification; an identification of a reference signal set: an identification of a reference signal: an identification of a TCI state; or an identification of spatial relationship information. Schematically, the identification of the reference signal set includes multiple identifications of reference signals.

The reference signal includes at least one of the following: a CSI-RS, a SSB, or a SRS.

A second type of information: beam identification information of a first uplink beam, and a P-MPR measurement value and/or a power headroom value corresponding to the first uplink beam. The P-MPR value of the first uplink beam is not less than the MPE threshold.

Schematically, the beam identification information is beam-related indication information. The beam identification information includes at least one of the following identifications: an identification of a reference signal: an identification of a TCI state; or an identification of spatial relationship information.

The reference signal includes at least one of: a CSI-RS: a SSB: or a SRS.

A third type of information: panel identification information of a second uplink panel, and a P-MPR measurement value and/or a power headroom value corresponding to the second uplink panel. The P-MPR value of the second uplink panel is less than the MPE threshold.

Schematically, the second uplink panel and the first uplink panel are different uplink panels. Explanation of the panel identification information, the P-MPR, the power headroom value, and the MPE may refer to aforementioned content, which is not repeated herein.

A fourth type of information: beam identification information of a second uplink beam, and a P-MPR measurement value and/or a power headroom value corresponding to the second uplink beam. The P-MPR value of the second uplink beam is less than the MPE threshold.

Schematically, the second uplink beam and the first uplink beam are different uplink beams. Explanation of the beam identification information, the P-MPR, the power headroom value, and the MPE may refer to aforementioned content, which is not repeated herein.

In an exemplary embodiment, the power information includes at least one of a panel identification, an identification of a reference signal set, an identification of a TCI state, and an identification of spatial relationship information of the first uplink panel. The identification of the reference signal set includes multiple identifications of reference signals. In addition, the power information further includes the P-MPR measurement value and/or the power headroom value corresponding to the first uplink panel.

In an exemplary embodiment, the power information includes at least one of an identification of a reference signal, an identification of a TCI state, and an identification of spatial relationship information of the first uplink beam, and the P-MPR measurement value and/or the power headroom value corresponding to the first uplink beam.

In an exemplary embodiment, the power information includes at least one of a panel identification and an identification of a reference signal of the second uplink panel, and the P-MPR measurement value and/or the power headroom value corresponding to the second uplink panel.

In an exemplary embodiment, the power information includes an identification of a reference signal of the second uplink beam, and the P-MPR measurement value and/or the power headroom value corresponding to the second uplink beam.

Schematically, the above embodiments may be combined arbitrarily, which is not repeated herein.

In an exemplary embodiment, taking a terminal including three uplink beams as an example, each uplink beam corresponds to a different P-MPR value, which may refer to the following table:

| | |
|---|---|
| uplink beam 1 | first P-MPR value |
| uplink beam 2 | second P-MPR value |
| uplink beam 3 | third P-MPR value |

The first P-MPR value is greater than the MPE threshold, the second P-MPR value is equal to the MPE threshold, and the third P-MPR value is less than the MPE threshold.

Based on this, the terminal transmits the power information to the network device, the power information includes relevant information of at least one of the uplink beam 1, the uplink beam 2, and the uplink beam 3. For example, the power information includes at least one of an identification of a reference signal, an identification of a TCI state, an identification of spatial relationship information of the uplink beam 1, and a P-MPR measurement value and/or a power headroom value corresponding to the uplink beam 1; and/or the power information includes an identification of a reference signal of the uplink beam 2, and a P-MPR measurement value and/or a power headroom value corresponding to the uplink beam 2; and/or the power information includes at least one of an identification of a reference signal, an identification of a TCI state, an identification of spatial relationship information of the uplink beam 3, and a P-MPR measurement value and/or a power headroom value corresponding to the uplink beam 3.

In some embodiments, in order to enable the network device to obtain more accurate power information, the power information may include at least one of the following information: n panel identifications and n pieces of first bit indication information, in which an i-th piece of first bit indication information is to indicate whether a P-MPR value corresponding to an i-th uplink panel of the terminal is less than the MPE threshold: m beam identifications and m pieces of second bit indication information, in which a j-th piece of second bit indication information is to indicate whether a P-MPR value corresponding to a j-th uplink beam of the terminal is less than the MPE threshold. Where, n and m are positive integers, i is a positive integer not greater than n, and j is a positive integer not greater than m.

Optionally, in a case where a P-MPR value corresponding to the first uplink panel or the first uplink beam of the terminal is not less than the MPE threshold, the power information further includes third bit indication information. The third bit indication information is to indicate the P-MPR measurement value corresponding to the first uplink panel or the first uplink beam.

In step 310, the P-MPR value corresponding to the uplink panel or uplink beam of the terminal is not less than the MPE threshold. Thus, the power information may further include the third bit indication information.

In an exemplary embodiment, taking the terminal including three uplink beams as an example, each uplink beam corresponds to a different P-MPR value, which may refer to the following table:

| | |
|---|---|
| uplink beam 1 | first P-MPR value |
| uplink beam 2 | second P-MPR value |
| uplink beam 3 | third P-MPR value |

The first P-MPR value is greater than the MPE threshold, the second P-MPR value is equal to the MPE threshold, and the third P-MPR value is less than the MPE threshold.

Based on this, the terminal transmits the power information to the network device, the power information includes relevant information of at least one of the uplink beam 1, the uplink beam 2, and the uplink beam 3.

At the same time, the power information further includes three pieces of second bit indication information. The second bit indication information corresponding to the uplink beam 1 and the uplink beam 2 are to indicate that the first P-MPR value and the second P-MPR value are not less than the MPE threshold, and the second bit indication information corresponding to the uplink beam 3 is to indicate that the third P-MPR value is less than the MPE threshold.

In the case where the P-MPR values corresponding to the uplink beam 1 and the uplink beam 2 are not less than the MPE threshold, the power information transmitted by the terminal to the network device further includes two pieces of third bit indication information to indicate the P-MPR measurement values corresponding to the uplink beam 1 and the uplink beam 2.

In summary, the method for transmitting power information provided in the embodiment of the disclosure, a triggering condition for the terminal to transmit the power information is added. When the P-MPR value corresponding to the uplink panel or the uplink beam of the terminal is not less than the MPE threshold, the terminal transmits the power information to the network device.

Figure 4:
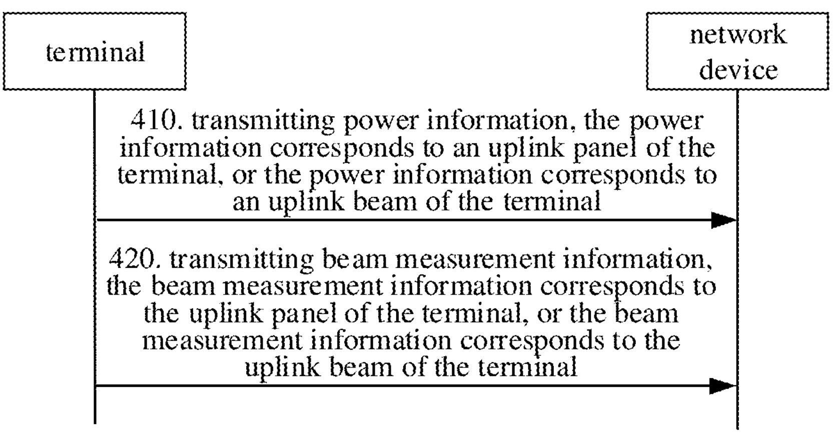
FIG. 4 is a flow chart illustrating a method for transmitting power information according to an exemplary embodiment of the disclosure.

FIG. 4 is a flow chart illustrating a method for transmitting power information according to an exemplary embodiment of the disclosure. For example, the method for transmitting power information is performed by the terminal 02 in FIG. 1, the method includes following steps.

Step 410, the terminal transmits power information to a network device.

Schematically, the power information corresponds to an uplink panel of the terminal, or the power information corresponds to an uplink beam of the terminal.

As mentioned above, the power information refers to parameter information related to power management of the terminal. In some embodiments, the power information includes at least one of the following four types of information.

A first type of information: panel identification information of a first uplink panel, and a P-MPR measurement value and/or a power headroom value corresponding to the first uplink panel. The P-MPR value of the first uplink panel is not less than an MPE threshold.

A second type of information: beam identification information of a first uplink beam, and a P-MPR measurement value and/or a power headroom value corresponding to the first uplink beam. The P-MPR value of the first uplink beam is not less than the MPE threshold.

A third type of information: panel identification information of a second uplink panel, and a P-MPR measurement value and/or a power headroom value corresponding to the second uplink panel. The P-MPR value of the second uplink panel is less than the MPE threshold.

A fourth type of information: beam identification information of a second uplink beam, and a P-MPR measurement value and/or a power headroom value corresponding to the second uplink beam. The P-MPR value of the second uplink beam is less than the MPE threshold.

Schematically, in order to enable the network device to obtain more accurate power information, the power information may include at least one of the following information: n panel identifications and n pieces of first bit indication information, in which an i-th piece of first bit indication information is to indicate whether a P-MPR value corresponding to an i-th uplink panel of the terminal is less than the MPE threshold: m beam identifications and m pieces of second bit indication information, in which a j-th piece of second bit indication information is to indicate whether a P-MPR value corresponding to a j-th uplink beam of the terminal is less than the MPE threshold. Where, n and m are positive integers, i is a positive integer not greater than n, and j is a positive integer not greater than m.

Optionally, in a case where a P-MPR value corresponding to the first uplink panel or the first uplink beam of the terminal is not less than the MPE threshold, the power information further includes third bit indication information. The third bit indication information is to indicate the P-MPR measurement value corresponding to the first uplink panel or the first uplink beam.

Step 410 is the same as step 210, and reference can be made, which is not repeated herein.

Step 420, the terminal transmits beam measurement information to the network device.

Schematically, the beam measurement information corresponds to the uplink panel of the terminal, or the beam measurement information corresponds to the uplink beam of the terminal.

The beam measurement information includes at least one type of following information.

A first type of information: the panel identification information of a first uplink panel, and a beam measurement result corresponding to the first uplink panel. The P-MPR value of the first uplink panel is less than the MPE threshold.

Schematically, the panel identification information refers to panel-related identification information. The panel identification information includes at least one of the following identifications: a panel identification; an identification of a reference signal set; an identification of a reference signal: an identification of a TCI state; or an identification of spatial relationship information. Schematically, the identification of the reference signal set includes multiple identifications of reference signals.

The reference signal includes at least one of the following: a CSI-RS, a SSB, or a SRS.

Schematically, the beam measurement result includes at least one of: a first signal quality parameter, the first signal quality parameter being obtained by measuring a downlink reference signal: or a second signal quality parameter, the second signal quality parameter being determined based on the first signal quality parameter and the P-MPR value and/or a power headroom value of the corresponding uplink panel or uplink beam. The first signal quality parameter is obtained by measuring a downlink reference signal of the corresponding uplink panel or uplink beam. For example, the first signal quality parameter is obtained by measuring a downlink reference signal corresponding to the first uplink beam.

The first signal quality parameter and/or the second signal quality parameter includes at least one of: a layer 1 (L1)-Reference Signal Receiving Power (RSRP); or an L1-Signal to Interference plus Noise Ratio (SINR).

In addition, the P-MPR refers to a reduction value of a maximum transmission power of the terminal when a MPE requirement is satisfied. The MPE is an indicator requirement that limits electromagnetic radiation of the terminal and is provided from a perspective of human safety, and is configured to specify an average maximum radiation power density of the terminal in a certain direction.

A second type of information: beam identification information of a first uplink beam, and a beam measurement result corresponding to the first uplink beam. The P-MPR value of the first uplink beam is less than the MPE threshold.

Schematically, the beam identification information is beam-related indication information. The beam identification information includes at least one of the following identifications: an identification of a reference signal: an identification of a TCI state; or an identification of spatial relationship information.

The reference signal includes at least one of the following: a CSI-RS, a SSB, or a SRS.

Schematically, the beam measurement result includes at least one of: a first signal quality parameter, the first signal quality parameter being obtained by measuring a downlink reference signal: or a second signal quality parameter, the second signal quality parameter being determined based on the first signal quality parameter and the P-MPR value and/or a power headroom value of the corresponding uplink panel or uplink beam.

The first signal quality parameter and/or the second signal quality parameter includes at least one of: an L1-RSRP: or an L1-SINR.

In addition, the P-MPR refers to a reduction value of a maximum transmission power of the terminal when a MPE requirement is satisfied. The MPE is an indicator requirement that limits electromagnetic radiation of the terminal and is provided from a perspective of human safety, and is configured to specify an average maximum radiation power density of the terminal in a certain direction.

A third type of information: panel identification information of a second uplink panel, and a beam measurement result corresponding to the second uplink panel. The P-MPR value of the second uplink panel is not less than the MPE threshold:

Schematically, the second uplink panel and the first uplink panel are different uplink panels. Explanation of the panel identification information, the beam measurement result, the P-MPR, and the MPE may refer to aforementioned content, which is not repeated herein.

A fourth type of information: beam identification information of a second uplink beam, and a beam measurement result corresponding to the second uplink beam. The P-MPR value of the second uplink beam is not less than the MPE threshold.

Schematically, the second uplink beam and the first uplink beam are different uplink beams. Explanation of the beam identification information, the beam measurement result, the P-MPR, and the MPE may refer to aforementioned content, which is not repeated herein.

A fifth type of information: panel identification information of a third uplink panel, and a beam measurement result corresponding to the third uplink panel. The third uplink panel is one of top i uplink panels among n uplink panels, and the n uplink panels are sorted according to corresponding P-MPR values, where n is a positive integer, and i is a positive integer not greater than n. The smaller the P-MPR value, the higher the ranking is.

Schematically, the third uplink panel is one or more uplink panels selected by sorting multiple uplink panels based on the P-MPR values corresponding to the multiple uplink panels, with a different classification mode from the first uplink panel and the second uplink panel. The explanation of the panel identification information, the beam measurement result, the P-MPR and the MPE may refer to aforementioned content, which is not repeated herein.

A sixth type of information: beam identification information of a third uplink beam, and a beam measurement result corresponding to the third uplink beam. The third uplink beam is one of top i uplink beams among m uplink beams, and the m uplink beams are sorted according to corresponding P-MPR values, where m is a positive integer, and i is a positive integer not greater than m. The smaller the P-MPR value, the higher the ranking is.

Schematically, the third uplink panel is one or more uplink panels selected by sorting multiple uplink panels based on the P-MPR values corresponding to the multiple uplink panels, with a different classification mode from the first uplink panel and the second uplink panel. The explanation of the beam identification information, the beam measurement result, the P-MPR and the MPE may refer to aforementioned content, which is not repeated herein.

The third uplink panel or the third uplink beam may be determined by one of the following methods.

The terminal sorts the P-MPR values of the n uplink panels or the m uplink beams in an ascending order, and determines the one with the smallest P-MPR value as the third uplink panel or the third uplink beam.

The terminal sorts the P-MPR values of the n uplink panels or the m uplink beams in an ascending order, and determines multiple ones ranked first as the third uplink panels or the third uplink beams.

The terminal sorts the P-MPR values of the n uplink panels or the m uplink beams in an ascending order, and determines one or more P-MPR values that are less than a preset value as the third uplink panel or the third uplink beam.

For example, there are 10 uplink beams in the terminal. The terminal sorts the P-MPR values of the 10 uplink beams in an ascending order, and determines the one with the smallest P-MPR value as the third uplink beam. Alternatively, the terminal determines 5 uplink beams with P-MPR values ranked top 5 as the third uplink beams. Alternatively, the terminal determines three uplink beams with P-MPR values less than the preset value as the third uplink beams.

In an exemplary embodiment, the terminal transmits the beam measurement information to the network device. The beam measurement information includes at least one of the panel identification, the identification of a reference signal set, the identification of a TCI state, and the identification of spatial relationship information of the first uplink panel. The identification of a reference signal set includes multiple identifications of reference signals. In addition, the beam measurement information also includes the first signal quality parameter, which includes the L1-RSRP and/or the L1-SINR corresponding to the first uplink panel.

In an exemplary embodiment, the terminal transmits the beam measurement information to the network device. The beam measurement information includes at least one of the identification of a reference signal, the identification of a TCI state, and the identification of spatial relationship information of the first uplink beam, and a second signal quality parameter. The L1-RSRP included in the second signal quality parameter is determined based on the L1-RSRP and the P-MPR values and/or the power headroom value corresponding to the first uplink beam.

In an exemplary embodiment, the terminal transmits the beam measurement information to the network device. The beam measurement information includes at least one of the panel identification and the identification of a reference signal of the second uplink panel, and the second signal quality parameter. The L1-SINR included in the second signal quality parameter is determined based on the L1-SINR and the P-MPR value and/or the power headroom value corresponding to the second uplink panel.

In an exemplary embodiment, the terminal transmits the beam measurement information to the network device. The beam measurement information includes the identification of a reference signal of the second uplink beam and a first signal quality parameter. The first signal quality parameter includes an L1-RSRP and/or an L1-SINR corresponding to the second uplink beam.

Schematically, the above embodiments may be combined arbitrarily, which is not repeated herein.

Schematically, step 410 and step 420 may be executed simultaneously or not simultaneously. One or all of them can be executed.

It can be understood that in any embodiment of the disclosure, when the terminal transmits multiple types of information corresponding to the same uplink panel to the network device, such as two or more of the P-MPR value, the power headroom value, and the beam measurement result of the uplink panel, the information may only include the panel identification information of the uplink panel once. When the terminal transmits multiple types of information corresponding to the same uplink beam to the network device, such as two or more of the P-MPR value, the power headroom value, and the beam measurement result of the uplink beam, the information may only include the beam identification information of the uplink beam once.

In an exemplary embodiment, the terminal transmits the power information and the beam measurement information corresponding to the uplink panel 1 to the network device. The power information includes the panel identification information and the power headroom value of the uplink panel 1. The beam measurement result includes the panel identification information of the uplink panel 1 and the first signal quality parameter corresponding to uplink panel 1. The first signal quality parameter includes the L1-SINR corresponding to the uplink panel 1, which may refer to the following table:

| in a case where the panel identification information is reported for each type of information | in a case where the panel identification information is reported once |
|---|---|
| power information = [panel identification information of uplink panel 1, power headroom value of uplink panel 1]<br>beam measurement information = [panel identification information of uplink panel 1, a first signal quality parameter corresponding to uplink panel 1] | reported information = power information ∪ beam measurement information = [panel identification information of uplink panel 1, power headroom value of uplink panel 1, a first signal quality parameter corresponding to uplink panel 1] |

In an exemplary embodiment, the terminal transmits the power information and the beam measurement information corresponding to the uplink beam 1 to the network device. The power information includes the beam identification information and the P-MPR value of the uplink beam 1. The beam measurement result includes the beam identification information of the uplink beam 1 and the second signal quality parameter corresponding to the uplink beam 1. The L1-RSRP included in the second signal quality parameter is determined based on the L1-RSRP and the P-MPR value corresponding to the uplink beam 1, which may refer to the following table:

| in a case where the beam identification information is reported for each type of information | in a case where the beam identification information is reported once |
|---|---|
| power information = [beam identification information of uplink panel 1, P-MPR value of uplink panel 1] beam measurement information = [beam identification information of uplink panel 1, a second signal quality parameter corresponding to uplink panel 1] | reported information = power information ∪ beam measurement information = [beam identification information of uplink panel 1, P-MPR value of uplink panel 1, a second signal quality parameter corresponding to uplink panel 1] |

In summary, in the method for transmitting power information provided in the embodiment of the disclosure, the terminal may transmit the beam measurement information corresponding to the uplink panel or the uplink beam to the network device. The network device can perform uplink scheduling based on the power information and/or the beam measurement information, and select an appropriate uplink panel or uplink beam, thereby improving the uplink transmission performance. Meanwhile, the embodiment of the disclosure provides the information content contained in the beam measurement information and the information content contained in the corresponding identifications.

Figure 5:
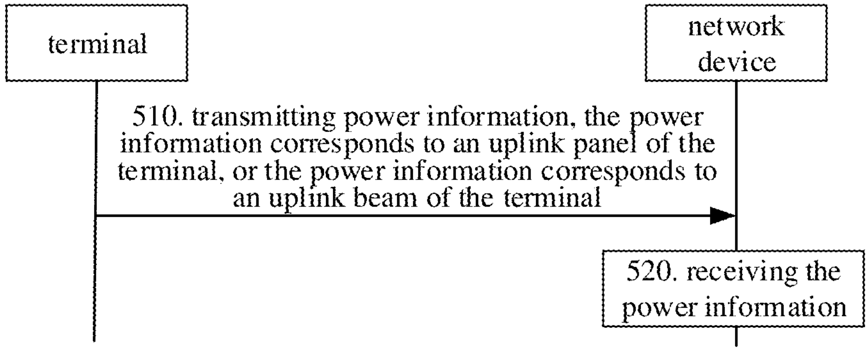
FIG. 5 is a flow chart illustrating a method for transmitting and receiving power information according to an exemplary embodiment of the disclosure.

FIG. 5 is a flow chart illustrating a method for transmitting and receiving power information according to an exemplary embodiment of the disclosure. For example, the method for transmitting power information is performed by the terminal 02 in FIG. 1, the method for receiving power information is performed by the network device 01 in FIG. 1. The method includes following steps.

Step 510: the terminal transmits power information to the network device.

Schematically, the power information corresponds to an uplink panel of the terminal, or the power information corresponds to an uplink beam of the terminal.

Step 520: the network device receives the power information transmitted by the terminal.

As mentioned above, the power information refers to parameter information related to power management of the terminal. In some embodiments, the power information includes at least one of the following four types of information.

A first type of information: panel identification information of a first uplink panel, and a P-MPR measurement value and/or a power headroom value corresponding to the first uplink panel. The P-MPR value of the first uplink panel is not less than an MPE threshold.

Schematically, the panel identification information is panel-related identification information. The panel identification information includes at least one of the following identifications: a panel identification: an identification of a reference signal set; an identification of a reference signal; an identification of a TCI state; or an identification of spatial relationship information. Schematically, the identification of the reference signal set includes multiple identifications of reference signals.

The reference signal includes at least one of the following: a CSI-RS, a SSB, or a SRS.

A second type of information: beam identification information of a first uplink beam, and a P-MPR measurement value and/or a power headroom value corresponding to the first uplink beam. The P-MPR value of the first uplink beam is not less than the MPE threshold.

Schematically, the beam identification information is beam-related indication information. The beam identification information includes at least one of the following identifications: an identification of a reference signal: an identification of a TCI state; or an identification of spatial relationship information.

The reference signal includes at least one of: a CSI-RS: a SSB: or a SRS.

A third type of information: panel identification information of a second uplink panel, and a P-MPR measurement value and/or a power headroom value corresponding to the second uplink panel. The P-MPR value of the second uplink panel is less than the MPE threshold.

Schematically, the second uplink panel and the first uplink panel are different uplink panels. Explanation of the panel identification information, the P-MPR, the power headroom value, and the MPE may refer to aforementioned content, which is not repeated herein.

A fourth type of information: beam identification information of a second uplink beam, and a P-MPR measurement value and/or a power headroom value corresponding to the second uplink beam. The P-MPR value of the second uplink beam is less than the MPE threshold.

Schematically, the second uplink beam and the first uplink beam are different uplink beams. Explanation of the beam identification information, the P-MPR, the power headroom value, and the MPE may refer to aforementioned content, which is not repeated herein.

In an exemplary embodiment, the network device receives the power information transmitted by the terminal. The power information includes at least one of a panel identification, an identification of a TCI state, and an identification of spatial relationship information of the first uplink panel, and the P-MPR measurement value and/or the power headroom value corresponding to the first uplink panel.

In an exemplary embodiment, the network device receives the power information transmitted by the terminal. The power information includes at least one of an identification of a TCI state and an identification of spatial relationship information of the first uplink beam, and the P-MPR measurement value and/or the power headroom value corresponding to the first uplink beam.

In an exemplary embodiment, the network device receives the power information transmitted by the terminal. The power information includes at least one of an identification of a reference signal of the second uplink panel, and the P-MPR measurement value and/or the power headroom value corresponding to the second uplink panel.

In an exemplary embodiment, the network device receives the power information transmitted by the terminal. The power information includes an identification of a reference signal of the second uplink beam, and the P-MPR measurement value and/or the power headroom value corresponding to the second uplink beam.

Schematically, the above embodiments may be combined arbitrarily, which is not repeated herein.

In some embodiments, in order to enable the network device to obtain more accurate power information, the power information may include at least one of the following information: n panel identifications and n pieces of first bit indication information, in which an i-th piece of first bit indication information is to indicate whether a P-MPR value corresponding to an i-th uplink panel of the terminal is less than the MPE threshold: m beam identifications and m pieces of second bit indication information, in which a j-th piece of second bit indication information is to indicate whether a P-MPR value corresponding to a j-th uplink beam of the terminal is less than the MPE threshold. Where, n and m are positive integers, i is a positive integer not greater than n, and j is a positive integer not greater than m.

Optionally, in a case where a P-MPR value corresponding to the first uplink panel or the first uplink beam of the terminal is not less than the MPE threshold, the power information further includes third bit indication information. The third bit indication information is to indicate the P-MPR measurement value corresponding to the first uplink panel or the first uplink beam.

In summary, the method for receiving power information provided in the embodiment of the disclosure, by receiving the power information corresponding to the uplink panel or the uplink beam transmitted by the terminal, the network device can perform uplink scheduling based on this, and select a suitable uplink panel or uplink beam, thereby improving the uplink transmission performance.

Meanwhile, the embodiments of the disclosure provide the information content contained in the power information and the information content contained in the corresponding identifications.

In addition, in the embodiments of the disclosure, the power information includes the first bit indication information or the second bit indication information, which is to indicate whether the P-MPR value of the corresponding uplink panel or uplink beam is greater than the MPE threshold. The power information further includes the third bit indicator information, which is to indicate the P-MPR measurement value of the corresponding uplink panel or uplink beam.

FIG. 6 is a flow chart illustrating a method for transmitting and receiving power information according to an exemplary embodiment of the disclosure. For example, the method for transmitting power information is performed by the terminal 02 in FIG. 1, the method for receiving power information is performed by the network device 01 in FIG. 1. The method includes following steps.

Step 610, it is determined that a P-MPR value corresponding to an uplink panel or an uplink beam of the terminal is not less than an MPE threshold, and the terminal transmits power information to the network device.

Schematically, the power information corresponds to the uplink panel of the terminal, or the power information corresponds to the uplink beam of the terminal.

As mentioned above, the P-MPR refers to a reduction value of a maximum transmission power of the terminal when a MPE requirement is satisfied. The MPE is an indicator requirement that limits electromagnetic radiation of the terminal and is provided from a perspective of human safety, and is configured to specify an average maximum radiation power density of the terminal in a certain direction.

In step 610, a triggering condition for the terminal to transmit the power information to the network device includes: the P-MPR value corresponding to the uplink panel or the uplink beam of the terminal being not less than the MPE threshold. That is to say, the reduction value of a transmission power of the uplink panel or the uplink beam is greater than or equal to a preset threshold of the indicator.

Step 620: the network device receives the power information transmitted by the terminal.

As mentioned above, the power information refers to parameter information related to power management of the terminal. In some embodiments, the power information includes at least one of the following four types of information.

A first type of information: panel identification information of a first uplink panel, and a P-MPR measurement value and/or a power headroom value corresponding to the first uplink panel. The P-MPR value of the first uplink panel is not less than an MPE threshold.

Schematically, the panel identification information is panel-related identification information. The panel identification information includes at least one of the following identifications: a panel identification: an identification of a reference signal set; an identification of a reference signal: an identification of a TCI state; or an identification of spatial relationship information. Schematically, the identification of the reference signal set includes multiple identifications of reference signals.

The reference signal includes at least one of the following: a CSI-RS, a SSB, or a SRS.

A second type of information: beam identification information of a first uplink beam, and a P-MPR measurement value and/or a power headroom value corresponding to the first uplink beam. The P-MPR value of the first uplink beam is not less than the MPE threshold.

Schematically, the beam identification information is beam-related indication information. The beam identification information includes at least one of the following identifications: an identification of a reference signal: an identification of a TCI state; or an identification of spatial relationship information.

The reference signal includes at least one of: a CSI-RS: a SSB: or a SRS.

A third type of information: panel identification information of a second uplink panel, and a P-MPR measurement value and/or a power headroom value corresponding to the second uplink panel. The P-MPR value of the second uplink panel is less than the MPE threshold.

Schematically, the second uplink panel and the first uplink panel are different uplink panels. Explanation of the panel identification information, the P-MPR, the power headroom value, and the MPE may refer to aforementioned content, which is not repeated herein.

A fourth type of information: beam identification information of a second uplink beam, and a P-MPR measurement value and/or a power headroom value corresponding to the second uplink beam. The P-MPR value of the second uplink beam is less than the MPE threshold.

Schematically, the second uplink beam and the first uplink beam are different uplink beams. Explanation of the beam identification information, the P-MPR, the power headroom value, and the MPE may refer to aforementioned content, which is not repeated herein.

In an exemplary embodiment, taking a terminal including three uplink beams as an example, each uplink beam corresponds to a different P-MPR value, which may refer to the following table:

| | |
|---|---|
| uplink beam 1 | first P-MPR value |
| uplink beam 2 | second P-MPR value |
| uplink beam 3 | third P-MPR value |

The first P-MPR value is greater than the MPE threshold, the second P-MPR value is equal to the MPE threshold, and the third P-MPR value is less than the MPE threshold.

Based on this, the network device receives the power information transmitted by the terminal, the power information includes relevant information of at least one of the uplink beam 1, the uplink beam 2, and the uplink beam 3. For example, the power information includes at least one of an identification of a reference signal, an identification of a TCI state, an identification of spatial relationship information of the uplink beam 1, and a P-MPR measurement value and/or a power headroom value corresponding to the uplink beam 1; and/or the power information includes an identification of a reference signal of the uplink beam 2, and a P-MPR measurement value and/or a power headroom value corresponding to the uplink beam 2; and/or the power information includes at least one of an identification of a reference signal, an identification of a TCI state, an identification of spatial relationship information of the uplink beam 3, and a P-MPR measurement value and/or a power headroom value corresponding to the uplink beam 3.

In some embodiments, in order to enable the network device to obtain more accurate power information, the power information may include at least one of the following information: n panel identifications and n pieces of first bit indication information, in which an i-th piece of first bit indication information is to indicate whether a P-MPR value corresponding to an i-th uplink panel of the terminal is less than the MPE threshold; m beam identifications and m pieces of second bit indication information, in which a j-th piece of second bit indication information is to indicate whether a P-MPR value corresponding to a j-th uplink beam of the terminal is less than the MPE threshold. Where, n and m are positive integers, i is a positive integer not greater than n, and j is a positive integer not greater than m.

Optionally, in a case where a P-MPR value corresponding to the first uplink panel or the first uplink beam of the terminal is not less than the MPE threshold, the power information further includes third bit indication information. The third bit indication information is to indicate the P-MPR measurement value corresponding to the first uplink panel or the first uplink beam.

In step 610, the P-MPR value corresponding to the uplink panel or the uplink beam of the terminal is not less than the MPE threshold. Thus, the power information may further include the third bit indication information.

Step 630, the network device performs uplink scheduling according to the power information.

The uplink scheduling refers to the scheduling of the network device performed by considering a maximum transmission power that the uplink panel or the uplink beam can achieve according to the received power information corresponding to the uplink panel or the uplink beam.

Schematically, the step 630 may be implemented as follows.

The network device determines a target beam based on the power information. The target beam is used by the terminal to transmit at least one of: an uplink TCI state, a spatial setting, and spatial relationship information.

In summary, the method for receiving power information provided in the embodiment of the disclosure, a triggering condition for receiving the power information is added.

When the P-MPR value corresponding to the uplink panel or the uplink beam of the terminal is not less than the MPE threshold, the network device receives the power information transmitted by the terminal.

FIG. 7 is a flow chart illustrating a method for transmitting and receiving power information according to an exemplary embodiment of the disclosure. For example, the method for transmitting power information is performed by the terminal 02 in FIG. 1, the method for receiving power information is performed by the network device 01 in FIG. 1. The method includes following steps.

Step 710: the terminal transmits power information to the network device.

Schematically, the power information corresponds to an uplink panel of the terminal, or the power information corresponds to an uplink beam of the terminal.

Step 720: the network device receives the power information transmitted by the terminal.

As mentioned above, the power information refers to parameter information related to power management of the terminal. In some embodiments, the power information includes at least one of the following four types of information.

- A first type of information: panel identification information of a first uplink panel, and a P-MPR measurement value and/or a power headroom value corresponding to the first uplink panel. The P-MPR value of the first uplink panel is not less than an MPE threshold.
- A second type of information: beam identification information of a first uplink beam, and a P-MPR measurement value and/or a power headroom value corresponding to the first uplink beam. The P-MPR value of the first uplink beam is not less than the MPE threshold.
- A third type of information: panel identification information of a second uplink panel, and a P-MPR measurement value and/or a power headroom value corresponding to the second uplink panel. The P-MPR value of the second uplink panel is less than the MPE threshold.
- A fourth type of information: beam identification information of a second uplink beam, and a P-MPR measurement value and/or a power headroom value corresponding to the second uplink beam. The P-MPR value of the second uplink beam is less than the MPE threshold.

Schematically, in order to enable the network device to obtain more accurate power information, the power information may include at least one of the following information: n panel identifications and n pieces of first bit indication information, in which an i-th piece of first bit indication information is to indicate whether a P-MPR value corresponding to an i-th uplink panel of the terminal is less than the MPE threshold; m beam identifications and m pieces of second bit indication information, in which a j-th piece of second bit indication information is to indicate whether a P-MPR value corresponding to a j-th uplink beam of the terminal is less than the MPE threshold. Where, n and m are positive integers, i is a positive integer not greater than n, and j is a positive integer not greater than m.

Optionally, in a case where a P-MPR value corresponding to the first uplink panel or the first uplink beam of the terminal is not less than the MPE threshold, the power information further includes third bit indication information. The third bit indication information is to indicate the P-MPR measurement value corresponding to the first uplink panel or the first uplink beam.

Steps 710 and 720 are the same as steps 610 and 620, and reference can be made, which are not repeated herein.

Step 730, the terminal transmits beam measurement information to the network device.

Schematically, the beam measurement information corresponds to the uplink panel of the terminal, or the beam measurement information corresponds to the uplink beam of the terminal.

Step 740, the network device receives the beam measurement information transmitted by the terminal.

As mentioned above, the beam measurement information includes at least one type of following information.

A first type of information: the panel identification information of a first uplink panel, and a beam measurement result corresponding to the first uplink panel. The P-MPR value of the first uplink panel is less than the MPE threshold.

Schematically, the panel identification information refers to panel-related identification information. The panel identification information includes at least one of the following identifications: a panel identification; an identification of a reference signal set; an identification of a reference signal: an identification of a TCI state; or an identification of spatial relationship information. Schematically, the identification of the reference signal set includes multiple identifications of reference signals.

The reference signal includes at least one of the following: a CSI-RS, a SSB, or a SRS.

Schematically, the beam measurement result includes at least one of: a first signal quality parameter, the first signal quality parameter being obtained by measuring a downlink reference signal: or a second signal quality parameter, the second signal quality parameter being determined based on the first signal quality parameter and the P-MPR value and/or a power headroom value of the corresponding uplink panel or uplink beam.

The first signal quality parameter and/or the second signal quality parameter includes at least one of: an L1-RSRP: or an L1-SINR.

In addition, the P-MPR refers to a reduction value of a maximum transmission power of the terminal when a MPE requirement is satisfied. The MPE is an indicator requirement that limits electromagnetic radiation of the terminal and is provided from a perspective of human safety, and is configured to specify an average maximum radiation power density of the terminal in a certain direction.

A second type of information: beam identification information of a first uplink beam, and a beam measurement result corresponding to the first uplink beam. The P-MPR value of the first uplink beam is less than the MPE threshold.

Schematically, the beam identification information is beam-related indication information. The beam identification information includes at least one of the following identifications: an identification of a reference signal: an identification of a TCI state; or an identification of spatial relationship information.

The reference signal includes at least one of the following: a CSI-RS, a SSB, or a SRS.

Schematically, the beam measurement result includes at least one of: a first signal quality parameter, the first signal quality parameter being obtained by measuring a downlink reference signal: or a second signal quality parameter, the second signal quality parameter being determined based on the first signal quality parameter and the P-MPR value and/or a power headroom value of the corresponding uplink panel or uplink beam.

The first signal quality parameter and/or the second signal quality parameter includes at least one of: an L1-RSRP: or an L1-SINR.

In addition, the P-MPR refers to a reduction value of a maximum transmission power of the terminal when a MPE requirement is satisfied. The MPE is an indicator requirement that limits electromagnetic radiation of the terminal and is provided from a perspective of human safety, and is configured to specify an average maximum radiation power density of the terminal in a certain direction.

A third type of information: panel identification information of a second uplink panel, and a beam measurement result corresponding to the second uplink panel. The P-MPR value of the second uplink panel is not less than the MPE threshold:

Schematically, the second uplink panel and the first uplink panel are different uplink panels. Explanation of the panel identification information, the beam measurement result, the P-MPR, and the MPE may refer to aforementioned content, which is not repeated herein.

A fourth type of information: beam identification information of a second uplink beam, and a beam measurement result corresponding to the second uplink beam. The P-MPR value of the second uplink beam is not less than the MPE threshold.

Schematically, the second uplink beam and the first uplink beam are different uplink beams. Explanation of the beam identification information, the beam measurement result, the P-MPR, and the MPE may refer to aforementioned content, which is not repeated herein.

A fifth type of information: panel identification information of a third uplink panel, and a beam measurement result corresponding to the third uplink panel. The third uplink panel is one of top i uplink panels among n uplink panels, and the n uplink panels are sorted according to corresponding P-MPR values, where n is a positive integer, and i is a positive integer not greater than n. The smaller the P-MPR value, the higher the ranking is.

Schematically, the third uplink panel is one or more uplink panels selected by sorting multiple uplink panels based on the P-MPR values corresponding to the multiple uplink panels, with a different classification mode from the first uplink panel and the second uplink panel. The explanation of the panel identification information, the beam measurement result, the P-MPR and the MPE may refer to aforementioned content, which is not repeated herein.

A sixth type of information: beam identification information of a third uplink beam, and a beam measurement result corresponding to the third uplink beam. The third uplink beam is one of top i uplink beams among m uplink beams, and the m uplink beams are sorted according to corresponding P-MPR values, where m is a positive integer, and i is a positive integer not greater than m. The smaller the P-MPR value, the higher the ranking is.

Schematically, the third uplink panel is one or more uplink panels selected by sorting multiple uplink panels based on the P-MPR values corresponding to the multiple uplink panels, with a different classification mode from the first uplink panel and the second uplink panel. The explanation of the beam identification information, the beam measurement result, the P-MPR and the MPE may refer to aforementioned content, which is not repeated herein.

The third uplink panel or the third uplink beam may be determined by one of the following methods.

The terminal sorts the P-MPR values of the n uplink panels or the m uplink beams in an ascending order, and determines the one with the smallest P-MPR value as the third uplink panel or the third uplink beam.

The terminal sorts the P-MPR values of the n uplink panels or the m uplink beams in an ascending order, and determines multiple ones ranked first as the third uplink panels or the third uplink beams.

The terminal sorts the P-MPR values of the n uplink panels or the m uplink beams in an ascending order, and determines one or more with a P-MPR value that is less than a preset value as the third uplink panel or the third uplink beam.

In an exemplary embodiment, the terminal transmits the beam measurement information to the network device. The beam measurement information includes at least one of the identification of a TCI state and the identification of spatial relationship information of the first uplink panel, and the first signal quality parameter. The first signal quality parameter includes the L1-RSRP and/or the L1-SINR corresponding to the first uplink panel.

In an exemplary embodiment, the terminal transmits the beam measurement information to the network device. The beam measurement information includes at least one of the identification of a reference signal and the identification of spatial relationship information of the first uplink beam, and a second signal quality parameter. The L1-RSRP included in the second signal quality parameter is determined based on the L1-RSRP and the P-MPR values and/or the power headroom value corresponding to the first uplink beam.

In an exemplary embodiment, the terminal transmits the beam measurement information to the network device. The beam measurement information includes the identification of a reference signal of the second uplink panel and the second signal quality parameter. The L1-SINR included in the second signal quality parameter is determined based on the L1-SINR and the P-MPR value and/or the power headroom value corresponding to the second uplink panel.

In an exemplary embodiment, the terminal transmits the beam measurement information to the network device. The beam measurement information includes the identification of a reference signal of the second uplink beam and a first signal quality parameter. The first signal quality parameter includes an L1-RSRP and/or an L1-SINR corresponding to the second uplink beam.

Schematically, the above embodiments may be combined arbitrarily, which is not repeated herein.

Schematically, step 710 and step 730 may be executed simultaneously or not simultaneously. One or all of them can be executed. Step 720 and step 740 may be executed simultaneously or not simultaneously. One or all of them can be executed.

Step 750, the network device performs uplink scheduling according to the power information.

The uplink scheduling refers to the scheduling of the network device performed by considering a maximum transmission power that the uplink panel or the uplink beam can achieve according to the received power information corresponding to the uplink panel or the uplink beam.

Schematically, the step 750 may be implemented as follows.

The network device determines a target beam based on the power information. The target beam is used by the terminal to transmit at least one of: an uplink TCI state, a spatial setting, and spatial relationship information.

In summary, the method for receiving power information provided in the embodiment of the disclosure, by receiving the beam measurement information corresponding to the uplink panel or the uplink beam transmitted by the terminal, the network device can perform the uplink scheduling based on the power information and/or the beam measurement information, and select an appropriate uplink panel or uplink beam, thereby improving the uplink transmission performance. Meanwhile, the embodiment of the disclosure provides the information content contained in the beam measurement information and the information content contained in the corresponding identifications.

Figure 8:
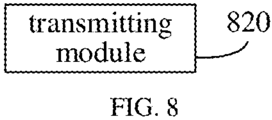
FIG. 8 is a block diagram illustrating an apparatus for transmitting power information according to an exemplary embodiment of the disclosure.

FIG. 8 is a block diagram illustrating an apparatus for transmitting power information according to an exemplary embodiment of the disclosure. The apparatus may be implemented as a terminal, or it may be implemented as part of a terminal. The apparatus includes:

a transmitting module 820, configured to transmit, by a terminal, power information to a network device.

The power information corresponds to an uplink panel of the terminal, or the power information corresponds to an uplink beam of the terminal.

In an optional design of the disclosure, the power information includes at least one of: panel identification information of a first uplink panel, and a power management-maximum power reduction P-MPR measurement value and/or a power headroom value corresponding to the first uplink panel, in which the P-MPR value of the first uplink panel is not less than a maximum permissible exposure MPE threshold: beam identification information of a first uplink beam, and a P-MPR measurement value and/or a power headroom value corresponding to the first uplink beam, in which the P-MPR value of the first uplink beam is not less than the MPE threshold: panel identification information of a second uplink panel, and a P-MPR measurement value and/or a power headroom value corresponding to the second uplink panel, in which the P-MPR value of the second uplink panel is less than the MPE threshold: or beam identification information of a second uplink beam, and a P-MPR measurement value and/or a power headroom value corresponding to the second uplink beam, in which the P-MPR value of the second uplink beam is less than the MPE threshold.

In an optional design of the disclosure, the transmitting module 820 is configured to: determine that a P-MPR value corresponding to the uplink panel or the uplink beam of the terminal is not less than an MPE threshold, and transmit the power information to the network device by the terminal.

In an optional design of the disclosure, the power information includes at least one of: n panel identifications and n pieces of first bit indication information, an i-th piece of first bit indication information is to indicate whether a P-MPR value corresponding to an i-th uplink panel of the terminal is less than an MPE threshold: or m beam identifications and m pieces of second bit indication information, a j-th piece of second bit indication information is to indicate whether a P-MPR value corresponding to a j-th uplink beam of the terminal is less than the MPE threshold: in which, n and m are both positive integers, i is a positive integer not greater than n, and j is a positive integer not greater than m.

In an optional design of the disclosure, a P-MPR value corresponding to a first uplink panel or a first uplink beam of the terminal is not less than the MPE threshold, and the power information further includes third bit indication information. The third bit indication information is to indicate the P-MPR measurement value corresponding to the first uplink panel or the first uplink beam.

In an optional design of the disclosure, the transmitting module 820 is further configured to: transmit, by the terminal, beam measurement information to the network device.

The beam measurement information corresponds to the uplink panel of the terminal, or the beam measurement information corresponds to the uplink beam of the terminal.

In an optional design of the disclosure, the beam measurement information includes at least one of: panel identification information of a first uplink panel, and a beam measurement result corresponding to the first uplink panel, in which a P-MPR value of the first uplink panel is less than an MPE threshold: beam identification information of a first uplink beam, and a beam measurement result corresponding to the first uplink beam, in which a P-MPR value of the first uplink beam is less than the MPE threshold: panel identification information of a second uplink panel, and a beam measurement result corresponding to the second uplink panel, in which a P-MPR value of the second uplink panel is not less than the MPE threshold: beam identification information of a second uplink beam, and a beam measurement result corresponding to the second uplink beam, in which a P-MPR value of the second uplink beam is not less than the MPE threshold: panel identification information of a third uplink panel, and a beam measurement result corresponding to the third uplink panel, in which the third uplink panel is one of top i uplink panels among n uplink panels, and the n uplink panels are sorted according to corresponding P-MPR values, where n is a positive integer, and i is a positive integer not greater than n: or beam identification information of a third uplink beam, and a beam measurement result corresponding to the third uplink beam, in which the third uplink beam is one of top i uplink beams among m uplink beams, and the m uplink beams are sorted according to corresponding P-MPR values, where m is a positive integer, and i is a positive integer not greater than m.

In an optional design of the disclosure, the panel identification information includes at least one of: a panel identification; an identification of a reference signal set: an identification of a reference signal: an identification of a transmission configuration indication TCI state: or an identification of spatial relationship information.

In an optional design of the disclosure, the beam identification information includes at least one of: an identification of a reference signal; an identification of a TCI state; or an identification of spatial relationship information.

In an optional design of the disclosure, the reference signal includes at least one of: a CSI-RS: a SSB: or a SRS.

In an optional design of the disclosure, the beam measurement result includes at least one of: a first signal quality parameter, the first signal quality parameter being obtained by measuring a downlink reference signal: or a second signal quality parameter, the second signal quality parameter being determined based on the first signal quality parameter and a P-MPR value and/or a power headroom value of a corresponding uplink panel or uplink beam.

In an optional design of the disclosure, the first signal quality parameter and/or the second signal quality parameter includes at least one of: an L1-RSRP: or an L1-SINR.

Figure 9:
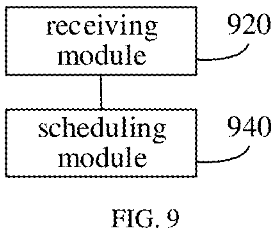
FIG. 9 is a block diagram illustrating an apparatus for receiving power information according to an exemplary embodiment of the disclosure.

FIG. 9 is a block diagram illustrating an apparatus for receiving power information according to an exemplary embodiment of the disclosure. The apparatus may be implemented as a network device, or it may be implemented as part of a network device. The apparatus includes:

- a receiving module 920, configured to receive, by a network device, power information transmitted by a terminal.

The power information corresponds to an uplink panel of the terminal, or the power information corresponds to an uplink beam of the terminal.

In an optional design of the disclosure, the power information includes at least one of: panel identification information of a first uplink panel, and a power management-maximum power reduction P-MPR measurement value and/or a power headroom value corresponding to the first uplink panel, in which the P-MPR value of the first uplink panel is not less than a maximum permissible exposure MPE threshold: beam identification information of a first uplink beam, and a P-MPR measurement value and/or a power headroom value corresponding to the first uplink beam, in which the P-MPR value of the first uplink beam is not less than the MPE threshold: panel identification information of a second uplink panel, and a P-MPR measurement value and/or a power headroom value corresponding to the second uplink panel, in which the P-MPR value of the second uplink panel is less than the MPE threshold: or beam identification information of a second uplink beam, and a P-MPR measurement value and/or a power headroom value corresponding to the second uplink beam, in which the P-MPR value of the second uplink beam is less than the MPE threshold.

In an optional design of the disclosure, the receiving module 920 is configured to: determine that a P-MPR value corresponding to the uplink panel or the uplink beam of the terminal is not less than an MPE threshold, and receive, by the network device, the power information transmitted by the terminal.

In an optional design of the disclosure, the power information includes at least one of: n panel identifications and n pieces of first bit indication information, an i-th piece of first bit indication information is to indicate whether a P-MPR value corresponding to an i-th uplink panel of the terminal is less than an MPE threshold; or m beam identifications and m pieces of second bit indication information, a j-th piece of second bit indication information is to indicate whether a P-MPR value corresponding to a j-th uplink beam of the terminal is less than the MPE threshold: in which, n and m are both positive integers, i is a positive integer not greater than n, and j is a positive integer not greater than m.

In an optional design of the disclosure, a P-MPR value corresponding to a first uplink panel or a first uplink beam of the terminal is not less than the MPE threshold, and the power information further includes third bit indication information. The third bit indication information is to indicate the P-MPR measurement value corresponding to the first uplink panel or the first uplink beam.

In an optional design of the disclosure, the receiving module 920 is further configured to: receive, by the network device, beam measurement information transmitted by the terminal. The beam measurement information corresponds to the uplink panel of the terminal, or the beam measurement information corresponds to the uplink beam of the terminal.

In an optional design of the disclosure, the beam measurement information includes at least one of: panel identification information of a first uplink panel, and a beam measurement result corresponding to the first uplink panel, in which a P-MPR value of the first uplink panel is less than an MPE threshold: beam identification information of a first uplink beam, and a beam measurement result corresponding to the first uplink beam, in which a P-MPR value of the first uplink beam is less than the MPE threshold: panel identification information of a second uplink panel, and a beam measurement result corresponding to the second uplink panel, in which a P-MPR value of the second uplink panel is not less than the MPE threshold: beam identification information of a second uplink beam, and a beam measurement result corresponding to the second uplink beam, in which a P-MPR value of the second uplink beam is not less than the MPE threshold: panel identification information of a third uplink panel, and a beam measurement result corresponding to the third uplink panel, in which the third uplink panel is one of top i uplink panels among n uplink panels, and the n uplink panels are sorted according to corresponding P-MPR values, where n is a positive integer, and i is a positive integer not greater than n: or beam identification information of a third uplink beam, and a beam measurement result corresponding to the third uplink beam, in which the third uplink beam is one of top i uplink beams among m uplink beams, and the m uplink beams are sorted according to corresponding P-MPR values, where m is a positive integer, and i is a positive integer not greater than m.

In an optional design of the disclosure, the panel identification information includes at least one of: a panel identification: an identification of a reference signal set: an identification of a reference signal: an identification of a TCI state: or an identification of spatial relationship information.

In an optional design of the disclosure, the beam identification information includes at least one of: an identification of a reference signal; an identification of a TCI state; or an identification of spatial relationship information.

In an optional design of the disclosure, the reference signal includes at least one of: a CSI-RS: a SSB: or a SRS.

In an optional design of the disclosure, the beam measurement result includes at least one of: a first signal quality parameter, the first signal quality parameter being obtained by measuring a downlink reference signal: or a second signal quality parameter, the second signal quality parameter being determined based on the first signal quality parameter and a P-MPR value and/or a power headroom value of a corresponding uplink panel or uplink beam.

In an optional design of the disclosure, the first signal quality parameter and/or the second signal quality parameter includes at least one of: an L1-RSRP: or an L1-SINR.

In an optional design of the disclosure, the apparatus further includes a scheduling module 940, configured to perform uplink scheduling by the network device according to the power information.

In an optional design of the disclosure, the scheduling module 940 is further configured to: perform uplink scheduling by the network device according to the beam measurement information.

In an optional design of the disclosure, the scheduling module 940 is further configured to: determine a target beam by the network device, in which the target beam is used by the terminal to transmit at least one of: an uplink TCI state, a spatial setting, and spatial relationship information.

Figure 10:
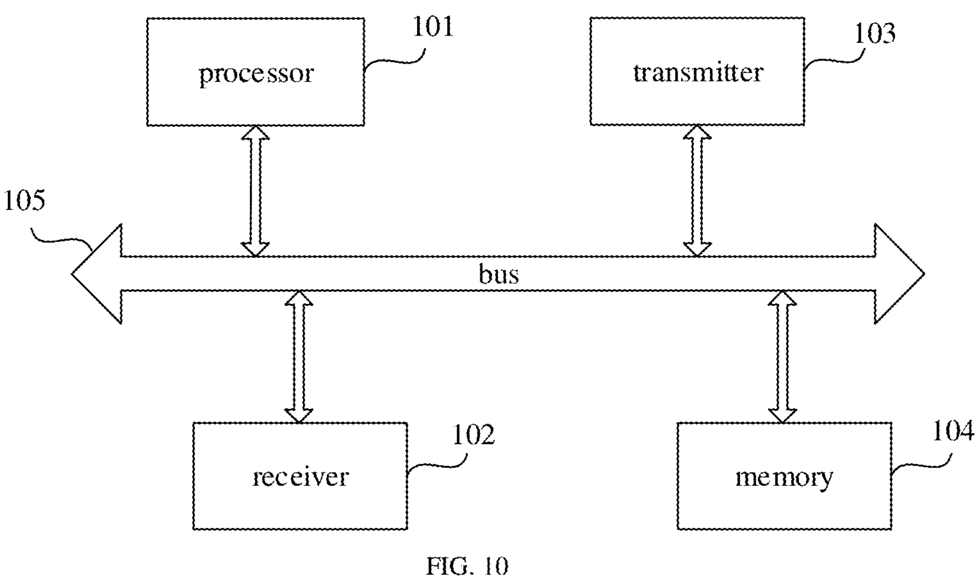
FIG. 10 is a block diagram illustrating a communication device according to an exemplary embodiment of the disclosure.

FIG. 10 is a block diagram illustrating a communication device according to an exemplary embodiment of the disclosure. The communication device includes: a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 may be implemented as a communication component, which may be a communication chip.

The memory 104 is connected to the processor 101 via the bus 105.

The memory 104 may be configured to store at least one instruction. The processor 101 is be configured to execute the at least one instruction to perform various steps in the method for transmitting power information as described above, or various steps in the method for receiving power information as described above.

In addition, the memory 104 may be implemented by any type of volatile or non-volatile storage device, or a combination thereof. The volatile or non-volatile storage device includes but is not limited to: a magnetic disk or an optical disk, an electrically erasable programmable read only memory (EEPROM), an erasable programmable read only memory (EPROM), a Static Random Access Memory (SRAM), a Read Only Memory (ROM), a Magnetic Memory, a Flash Memory, a Programmable Read Only Memory (PROM).

As illustrated in FIG. 10, the present disclosure provides a terminal including a processor 101 and a memory 104. At least one program code is stored in the memory 104. The program code is loaded and executed by the processor 101 to implement the method for transmitting power information as described above.

As illustrated in FIG. 10, the present disclosure provides a network device including a processor 101 and a memory 104. At least one program code is stored in the memory 104. The program code is loaded and executed by the processor 101 to implement the method for receiving power information as described above.

In an exemplary embodiment, there is also provided a computer-readable storage medium in which at least one program code is stored. The program code is loaded and executed by the processor 101 to implement the method for transmitting power information as described above, or the method for receiving power information as described above.

In an exemplary embodiment, there is also provided a computer program product or a computer program. The computer program product or the computer program including computer includes computer instructions. The computer instructions are stored in a computer-readable storage medium. A processor of a computer device reads the computer instructions from the computer-readable storage medium, and the processor executes the computer instructions, to enable the computer device to perform the method for transmitting power information as described above, or the method for receiving power information as described above.

According to an aspect of the present disclosure, there is provided a chip including a programmable logic circuit or program. The chip is configured to implement the method of transmit power information as described above, or the method for receiving power information as described above.

The above is only optional embodiments of the present disclosure and is not intended to limit the present disclosure. Any modifications, equivalents, substitutions, improvements, etc. made within the spirit and principles of the present disclosure shall be included within the scope of protection of the present disclosure.

What is claimed is:

1. A method for transmitting power information, performed by a terminal, comprising:

determining that a power management-maximum power reduction (P-MPR) value corresponding to an uplink panel or an uplink beam of the terminal is not less than a maximum permissible exposure (MPE) threshold; and transmitting power information to a network device;

wherein the power information corresponds to the uplink panel of the terminal or the uplink beam of the terminal, wherein the power information comprises at least one of:

panel identification information of the uplink panel, and at least one of a P-MPR measurement value or a power headroom value corresponding to the uplink panel; or beam identification information of the uplink beam, and at least one of a P-MPR measurement value or a power headroom value corresponding to the uplink beam.

2. The method of claim 1, wherein the power information comprises at least one of:

n panel identifications and n pieces of first bit indication information, wherein an i-th piece of first bit indication information indicates whether a P-MPR value corresponding to an i-th uplink panel of the terminal is less than the MPE threshold; or m beam identifications and m pieces of second bit indication information, wherein a j-th piece of second bit indication information indicates whether a P-MPR value corresponding to a j-th uplink beam of the terminal is less than the MPE threshold;

wherein n and m are both positive integers, i is a positive integer not greater than n, and j is a positive integer not greater than m.

3. The method of claim 2, wherein the power information further comprises third bit indication information;

wherein the third bit indication information indicates the P-MPR measurement value corresponding to the uplink panel or the uplink beam.

4. The method of claim 1, further comprising:

transmitting beam measurement information to the network device;

wherein the beam measurement information corresponds to the uplink panel of the terminal, or the uplink beam of the terminal.

5. The method of claim 1, wherein the panel identification information comprises at least one of:

a panel identification;

an identification of a reference signal set;

an identification of a reference signal;

an identification of a transmission configuration indication (TCI) state; or an identification of spatial relationship information.

6. The method of claim 1, wherein the beam identification information comprises at least one of:

an identification of a reference signal;

an identification of a TCI state; or an identification of spatial relationship information.

7. The method of claim 5, wherein the reference signal comprises at least one of:

a channel state information-reference signal (CSI-RS);

a synchronous signal block (SSB); or a sounding reference signal (SRS).

8. A method for receiving power information, performed by a network device, comprising:

determining that a power management-maximum power reduction (P-MPR) value corresponding to an uplink panel or an uplink beam of a terminal is not less than a maximum permissible exposure (MPE) threshold; and receiving power information transmitted by a terminal;

wherein the power information corresponds to the uplink panel of the terminal or the uplink beam of the terminal;

wherein the power information comprises at least one of:

panel identification information of the uplink panel, and at least one of a P-MPR measurement value or a power headroom value corresponding to the uplink panel; or beam identification information of the uplink beam, and at least one of a P-MPR measurement value or a power headroom value corresponding to the uplink beam.

9. The method of claim 8, wherein the power information comprises at least one of:

n panel identifications and n pieces of first bit indication information, wherein an i-th piece of first bit indication information indicates whether a P-MPR value corresponding to an i-th uplink panel of the terminal is less than the MPE threshold; or m beam identifications and m pieces of second bit indication information, wherein a j-th piece of second bit indication information indicates whether a P-MPR value corresponding to a j-th uplink beam of the terminal is less than the MPE threshold;

wherein n and m are both positive integers, i is a positive integer not greater than n, and j is a positive integer not greater than m.

10. The method of claim 9, wherein the power information further comprises third bit indication information;

wherein the third bit indication information indicates the P-MPR measurement value corresponding to the uplink panel or the uplink beam.

11. The method of claim 8, wherein the panel identification information comprises at least one of:

a panel identification;

an identification of a reference signal set;

an identification of a reference signal;

an identification of a transmission configuration indication (TCI) state; or an identification of spatial relationship information.

12. The method of claim 8, wherein the beam identification information comprises at least one of:

an identification of a reference signal;

an identification of a TCI state; or an identification of spatial relationship information.

13. The method of claim 11, wherein the reference signal comprises at least one of:

a channel state information-reference signal (CSI-RS);

a synchronous signal block (SSB); or a sounding reference signal (SRS).

14. The method of claim 8, further comprising:

performing uplink scheduling according to the power information, wherein performing uplink scheduling comprises:

determining a target beam, wherein the target beam is used by the terminal to transmit at least one of: an uplink TCI state, a spatial setting, or spatial relationship information.

15. A terminal, comprising:

a processor; and a memory having at least one program code stored therein;

wherein the processor is configured to:

determine that a power management-maximum power reduction (P-MPR) value corresponding to an uplink panel or an uplink beam of a terminal is not less than a maximum permissible exposure (MPE) threshold; and transmit power information to a network device;

wherein the power information corresponds to the uplink panel of the terminal or the uplink beam of the terminal;

wherein the power information comprises at least one of:

panel identification information of the uplink panel, and at least one of a P-MPR measurement value or a power headroom value corresponding to the uplink panel; or beam identification information of the uplink beam, and at least one of a P-MPR measurement value or a power headroom value corresponding to the uplink beam.

16. A network device, comprising:

a processor; and a memory having at least one program code stored therein;

wherein the processor is configured to perform the method of claim 8.

* * * * *